DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 392

T913,003

TERNE METAL BATH COMPOSITION

James C. Siple, Franklin Township, Westmoreland County, Pa., assignor to United States Steel Corporation

Filed Sept. 25, 1972, Ser. No. 291,848

**Int. Cl. C23c *1/06***

U.S. Cl. 117—51

No Drawing. 3 Pages Specification

The subject invention is directed to the use of an economic terne-coating bath composition which provides protective coatings at least equivalent to those of conventional terne-alloy baths. Such conventional baths generally contain about 85 percent lead and about 15 percent tin. Significant economies are achieved in the instant invention by substituting antimony for a major portion of the tin. The new bath composition contains only about 5 to 10 percent tin, .2 to 4% antimony, balance lead.